Figure 1:
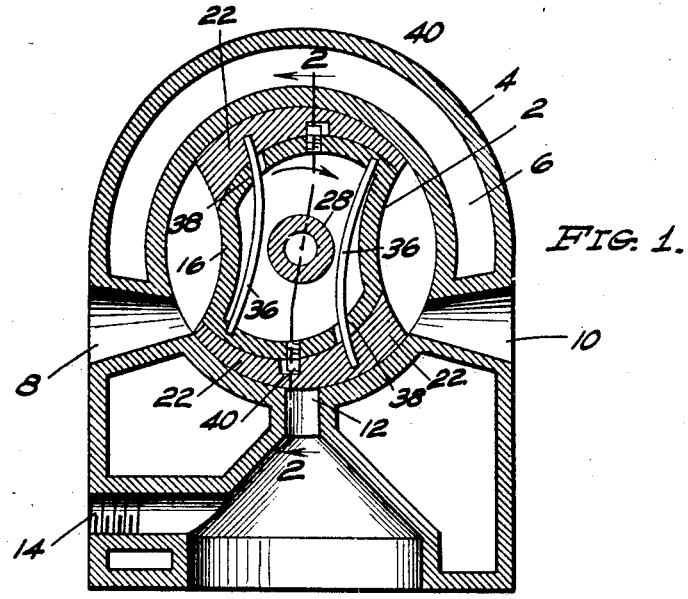

Jan. 1, 1929.

R. WEHR 1,697,098

VALVE CONSTRUCTION

Filed July 11, 1927

INVENTOR.
RUDOLPH WEHR
BY
ATTORNEY

Patented Jan. 1, 1929.

1,697,098

UNITED STATES PATENT OFFICE.

RUDOLPH WEHR, OF LOS ANGELES, CALIFORNIA, ASSIGNOR TO THE WEHR MOTOR COMPANY, A CORPORATION OF CALIFORNIA.

VALVE CONSTRUCTION.

Application filed July 11, 1927. Serial No. 204,737.

My invention relates to valve and valve constructions, especially those of the rotary type in which means are provided for automatically compensating at all times for the temperature and wear changes to which such constructions and valves are subjected so that any leakage of the fluid may be effectively prevented.

It accordingly is an object of my invention to provide a novel form of valve construction in which a preferably sectional form of valve is equipped with means whereby said sections may be detachably associated, said sections being also provided with a set of segmental peripherally floating shoes or members comprising curved wedges concentric with said valves, and rotatable therewith, said shoes or wedges being automatically held to the inner wall of the casing of the valve by a means such as a pair of curved springs, the movement of said wedges or shoes against the action of said springs being limited by a pin and slot connection, whereby leakage between the ports is effectively prevented, notwithstanding changes in temperature and conditions of wear.

It is also within the province of my invention to provide a novel form of lubricating means for lubricating the bearings of the valve, which valve is equipped with a channel or a hollow shaft, which channel or hollow shaft is provided with means for facilitating the movement of the lubricant, said means preferably comprising a spiral device whereby a screw action of the lubricant is provided.

The above and other objects and advantages of my invention, as will hereinafter more fully appear, I attain by the apparatus constructed in accordance with the specification and illustrated in the drawings accompanying the same and forming a part of my application.

Figure 2:
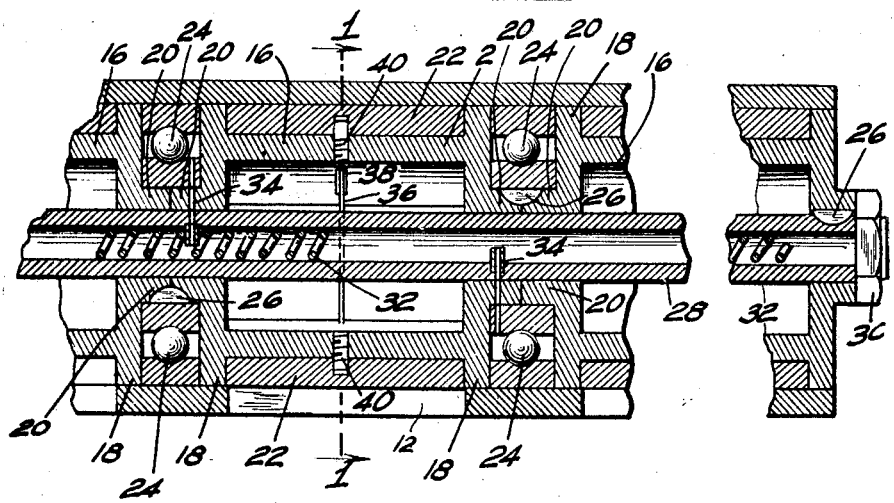

Reference is had to the accompanying drawings, in which similar reference characters denote similar parts. In the drawings, Fig. 1 is a transverse cross-sectional view of my invention, taken on the line 1—1, Fig. 2, looking in the direction of the arrows, and Fig. 2 is a fragmentary longitudinal sectional view taken on the line 2—2, Fig. 1, looking in the direction of the arrows.

Describing my invention more in detail, I have shown the same as applied to a multi-cylinder internal combustion engine, it being of course understood that in its broadest aspects it is not to be limited to such. My novel form of valve, designated generally by the numeral 2, is adapted to be operated in the valve casing 4, which may be of any preferred construction, and extends the entire length of the engine cylinder, said casing being equipped with the usual water pocket 6, said casing having the usual fluid intake port 8 and the exhaust port 10, a cylinder port 12 being used to supply the cylinder with the explosive mixture, the screw-threaded cavity 14 being used to house the spark plug.

The valve 2 is made up of a set of sections 16 provided with flanges 18 and 20, a set of eccentric floating segmental shoes, wedges or members 22 being adapted to be positioned between the flanges 18, and the ball bearings 24 being positioned between the same flanges 18, and surround the flanges 20, the assembly being held together by any preferred means, such as the keys 26 so that the sections 16 may be held in detachable relation.

Extending through the valve 2 is a channel or tubular shaft 28, which shaft is keyed to said valve, and hence rotatable therewith, any preferred means such as the nut and washer construction 30 being provided to hold the valve sections in longitudinal relation.

The tubular shaft 28 is adapted to house the lubricant for the valve, a spiral device 32 being positioned therein to facilitate the movement of said lubricant to supply the bearings 24 through the nipple and tube construction 34. As the valve is rotated the lubricant is propelled along the shaft by a screw action.

As hereinbefore stated, the shoes 22 are positioned on the valve 2 and are in concentric relation therewith, both valve and shoes being cut-away, as shown in Fig. 1 to provide a means for alternatively connecting the cylinder port 12 with the inlet port 8 and the exhaust port 10, and a pair of curved spring elements 36 are provided for automatically holding the shoes 22 to the inner wall of the casing 4, slots 38 being provided to permit movement of said shoes in response to the tension of the springs 36, which movement is limited by the pin and slot connections 40.

The valve 2 being rotated in the direction of the arrow shown in Fig. 1, the springs 36 will at all times hold the shoes or members 22 to the inner wall of the casing, thus effectively compensating for any temperature changes and wear conditions, leakage between the ports being at all times effectively prevented.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. The combination of rotary valve and its casing provided with fluid inlet and exhaust ports, and a pair of eccentric floating segmental shoes rotatable with said valve for compensating for the effect of temperature changes and wear to which said valve and casing may be subjected.

2. The combination of a rotary valve and its casing, peripherally movable means rotatable with said valve for compensating for the effect of temperature changes and wear to which said valve and casing may be subjected.

3. In a valve construction, a valve casing, a rotary valve in said casing, and a pair of eccentric floating segmental temperature and wear compensating shoes movable in two directions, rotatable with said valve, substantially as described.

4. In a valve construction, a valve casing, a valve operable in said casing and a set of eccentric floating segmental temperature and wear compensating devices movable with said valve and also relative thereto.

5. In a valve construction, a valve casing, a sectional valve operable in said casing, means associated with said sections whereby they may be held in detachable relation, eccentric floating segmental temperature and wear compensating means movable with said valve and relatively thereto, means associated with said valve for moving said compensating means, and means for limiting said movement.

6. In a valve construction, a valve casing, a valve adapted to be rotated in said casing, curved concentric wedge members rotatable with said valve, spring means for insuring that said wedge members shall be in continual engagement with the inner wall of said casing, and means associated with said valve and said wedge members for limiting the peripheral movement of said wedge members.

7. In a valve construction, a valve casing, a valve adapted to be rotated in said casing, eccentric floating segmental automatic temperature and wear compensating shoes rotatable with said valve, and means rotatable with said valve whereby said valve may be lubricated.

8. In a valve construction, a valve casing, a valve adapted to be rotated in said casing, a set of eccentric floating segmental temperature and wear compensating shoes rotatable with said valve, a lubricating channel extending through said valve, and spiral means in said channel for facilitating the lubrication of said valve.

9. In a valve construction, a valve casing, a rotary valve in said casing, a pair of segmental temperature and wear compensating shoes rotatable with said valve, a set of curved springs for forcing said shoes against the wall of said casing, and pin and slot connections for limiting the movement of said shoes against the action of said springs.

In testimony whereof I have signed my name to this specification.

RUDOLPH WEHR.